United States Patent Office 2,830,077
Patented Apr. 8, 1958

2,830,077

12 CARBOXAMIDO-12 HYDROXYSTEARIC ACID AND ESTERS THEREOF

Thomas R. Steadman, Waban, and John O. H. Peterson, Jr., Burlington, Mass., assignors to National Research Corporation, Cambridge, Mass., a corporation of Massachusetts No Drawing. Application December 17, 1956
Serial No. 628,483

4 Claims. (Cl. 260—482)

This invention relates to the production of chemicals and in particular to the production of novel amides.

A principal object of the present invention is to illustrate the preparation and properties of the new chemical compounds, 12-carboxamido-12-hydroxystearic acid and the corresponding esters thereof.

Other objects of the invention will in part be obvious and will in part appear hereinafter.

The invention accordingly comprises the new chemical compounds possessing the features and properties and the process involving the several steps and the order of one or more of such steps with respect to each of the others which are exemplified in the following detailed disclosure, and the scope of the application of which will be indicated in the claims.

For a fuller understanding of the nature and objects of the invention, reference should be had to the following detailed disclosure.

The present invention is directed to novel amides, useful as chemical intermediates and as components of resin compositions. For example, the amides may be converted to a dicarboxylic acid for use in the production of polyesters. The production of such a dicarboxylic acid is illustrated in the copending application Serial No. 628,484 executed even date herewith. These amides are preferably prepared by hydrolyzing 12-cyano-12-hydroxystearic acid or an ester thereof with a mineral acid. The esters, particularly the methyl ester of 12-cyano-12-hydroxystearic acid, are preferred since they are generally liquids. The 12-cyano-12-hydroxystearic acid or the esters thereof may be prepared in the manner illustrated in copending application Serial No. 579,713, filed April 23, 1956.

The amide which can be obtained from the hydrolysis of 12-cyano-12-hydroxystearic acid is 12-carboxamido-12-hydroxystearic acid. When an ester of 12-cyano-12-hydroxystearic acid is hydrolyzed, there is also obtained the corresponding ester of the amide-acid. For example, there results from the hydrolysis of the methyl ester, methyl 12-carboxamido-12-hydroxystearate and the amide acid, 12-carboxamido-12-hydroxystearic acid.

Specific detailed methods of producing the above amides are set forth in the following non-limiting examples.

Example I

To ten grams of methyl 12-cyano-12-hydroxystearate in a flask, 10 ml. of concentrated sulfuric acid (98 percent) were added dropwise over a ten-minute period. The temperature of the reaction mixture was allowed to rise from about 22° C. to 62° C. The reaction mixture was then added to 200 grams of ice and the resulting precipitate recovered. The product amounted to 9.0 grams and was identified as amide-acid admixed with the corresponding methyl ester. This amide mixture was found to contain methyl 12-carboxamido-12-hydroxystearate and 12-carboxamido-12-hydroxystearic acid. The amide-ester may be hydrolyzed to the amide-carboxylic acids by refluxing with a dilute aqueous solution of a mineral acid, such as hydrochloric, sulfuric, nitric, phosphoric and the like.

Example II

To 50 grams of methyl 12-cyano-12-hydroxystearate in a flask, 50 ml. of concentrated sulfuric acid (98%) were added dropwise over a ten-minute period. The temperature was allowed to rise from about 29° C. to 72° C. The reaction mixture was then heated for an additional 7 minutes at 75° C. and subsequently added to ice. The resulting precipitate was recovered. This product amounted to 47.1 grams of the amide-acid admixed with the corresponding methyl ester. This amide mixture was found to contain the same amides as indicated in Example I.

A quantitative conversion of the stearate to the amides was obtained as determined by the method of Mitchell and Ashby, J. Am. Chem. Soc. 67, 161–164 (1945).

Example III

A series of experiments was carried out wherein the methyl 12-cyano-12-hydroxystearate was added to the sulfuric acid. These experiments were performed in the temperature range of 40° C.–118° C. at reaction times varying from 0.9 to 1.34 minutes. These experiments, however, resulted in conversions of the stearate to the amides on the order of only 47.8% to 54.2%.

The above reactions can be represented by the following equation:

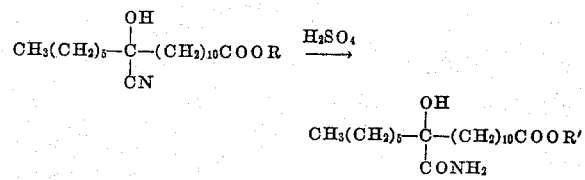

where R and R' may be a hydrogen, methyl, ethyl or like group. When R corresponds to hydrogen, then R' also represents a hydrogen group. When R represents an alkyl group such as methyl, then R' may represent a hydrogen or an alkyl group.

When a stearate is employed under the present reaction conditions, only part of the carboxyalkyl (e. g., carboxymethyl) groups may be hydrolyzed. A second hydrolysis can be accomplished by heating the product with a dilute aqueous solution of a mineral acid, such as hydrochloric, sulfuric, nitric, phosphoric or like acids. This results in complete hydrolysis of the carboxyalkyl groups without hydrolyzing the amide groups.

In carrying out the above reaction, it is preferable, in order to obtain nearly quantitative conversions of the starting material to the amide, to add the mineral acid to the starting material. A comparison of Example III with Examples I and II illustrates that conversions on the order of about 50 percent were obtained when the stearate was added to the sulfuric acid, whereas quantitative conversions were obtained when the sulfuric acid was added to the stearate. The hydrolysis of 12-cyano-12-hydroxystearic acid and esters thereof takes place when aqueous solutions of mineral acids such as those shown above are employed. Mineral acids with concentrations of above 50% and particularly above 80% are preferable for the hydrolysis of the cyano group.

Since certain changes may be made in the above processed product without departing from the scope of the invention herein involved, it is intended that all matter contained in the above description shall be interpreted as illustrative and not in a limiting sense.

What is claimed is:

1. The new chemical compounds of the general formula

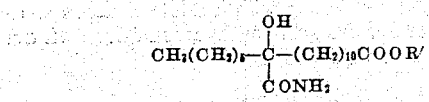

where R' is selected from the group consisting of hydrogen and lower alkyl groups.

2. The new chemical compound, 12-carboxamido-12-hydroxystearic acid.

3. The new chemical compound, methyl 12-carboxamido-12-hydroxystearate.

4. The new composition of matter which comprises a mixture of 12-carboxamido-12-hydroxystearic acid and methyl 12-carboxamido-12-hydroxystearate.

References Cited in the file of this patent

UNITED STATES PATENTS

| | | |
|---|---|---|
| 2,056,771 | Crawford | Oct. 6, 1936 |
| 2,140,469 | Crawford et al. | Dec. 13, 1938 |
| 2,391,251 | Long | Dec. 18, 1945 |